United States Patent [19]
Lee et al.

[11] Patent Number: 5,747,081
[45] Date of Patent: May 5, 1998

[54] PROCESS FOR PRODUCING A BEVERAGE COMPOSITION CONTAINING PINE SPROUT EXTRACT

[75] Inventors: Sung Il Lee, Incheon; Soo Min Park; Jeong Whan Kim, both of Seoul; Ho Kim, GoYang; Woon Young Gong, Seoul, all of Rep. of Korea

[73] Assignee: Cheil Foods & Chemicals, Inc., Seoul, Rep. of Korea

[21] Appl. No.: 786,342

[22] Filed: Jan. 23, 1997

Related U.S. Application Data

[62] Division of Ser. No. 540,356, Oct. 6, 1995.

[51] Int. Cl.$^6$ .................... A23L 1/30; A23L 2/00
[52] U.S. Cl. .................. 426/72; 426/330.3; 426/520; 426/534; 426/590; 426/650
[58] Field of Search .................... 426/72, 330.3, 426/520, 534, 590, 650, 651, 658

[56] References Cited

U.S. PATENT DOCUMENTS 5,466,453  11/1995  Uchida et al. .................... 426/655

OTHER PUBLICATIONS

Ariga, S., Patent Abstracts of Japan, 61-282059, Dec. 1986.
Nakayama, H., Patent Abstracts of Japan, 07-194337, Aug. 1995.
Takashima, H., Patent Abstracts of Japan, 01-300880, Dec. 1989.
Uchida et al., Patent Abstracts of Japan, 06-9419, Jan. 1994.

*Primary Examiner*—Leslie Wong
*Attorney, Agent, or Firm*—Burns, Doane, Swecker & Mathis, L.L.P.

[57] ABSTRACT

A process for producing a beverage composition containing pine sprout extract.

3 Claims, 1 Drawing Sheet

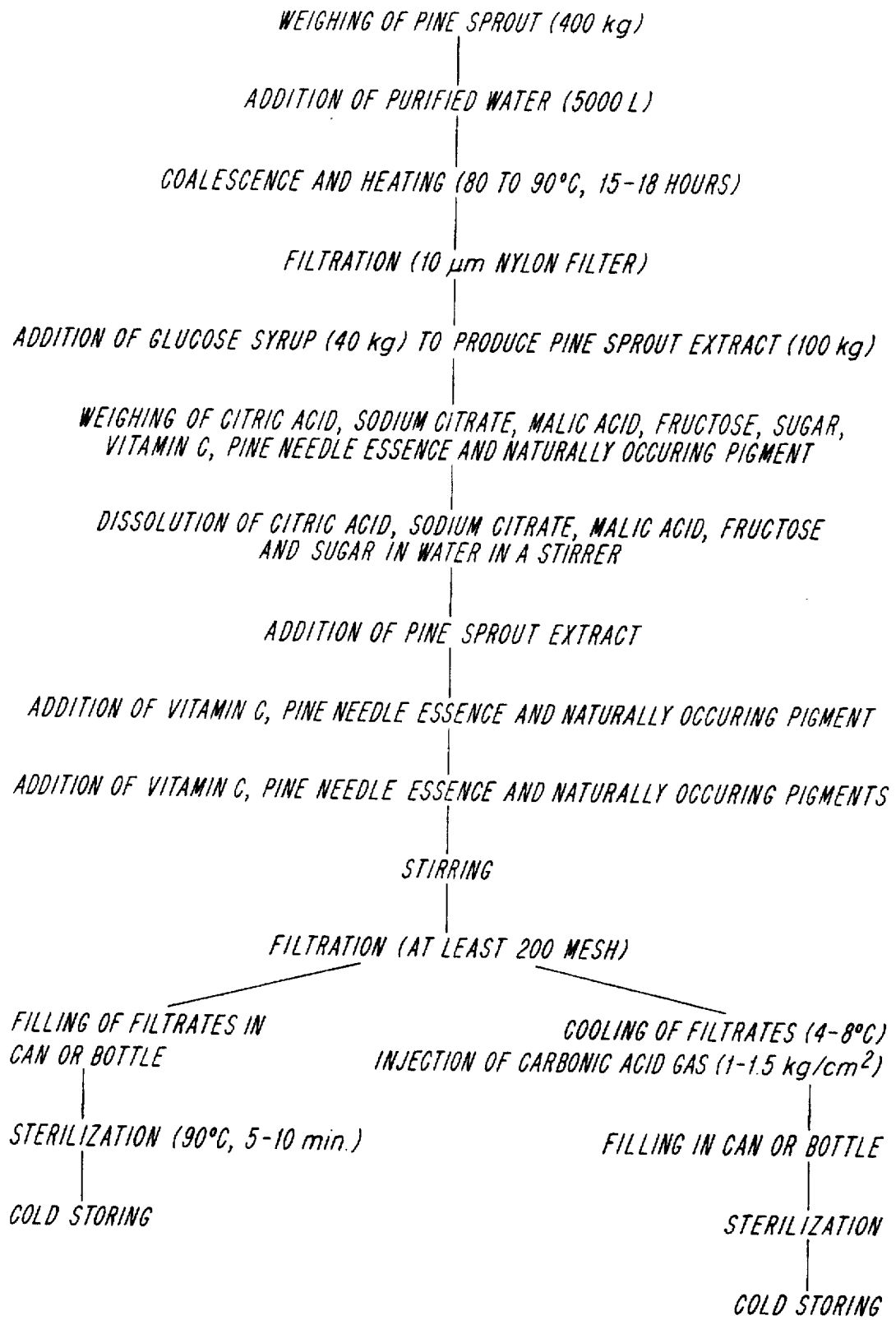

PROCESS FOR PRODUCING A BEVERAGE COMPOSITION CONTAINING PINE SPROUT EXTRACT

This application is a divisional of application Ser. No. 08/5540,356, filed Oct. 6, 1995.

FIELD OF THE INVENTION

The present invention relates to a beverage composition containing pine sprout extract, in particular, it relates to a health beverage composition that removes the bitterness of pine sprout extract but inparts the unique natural aroma and flavor of, as well as the pharmacological efficacy of pine.

BACKGROUND OF THE INVENTION

The Pinaceae family consists of Pinus Densifulora, Pinus Koraiensis and Pinus Thunbergii. Relevant literature reports that certain portions of pine exhibit a variety of pharmacological efficacy. For example, it dissolves blood coagulum and stimulates blood flow, prevents and treats colds, gout, inflammation, bronchial asthma and the like, and acts as analgesia, especially for rheumatoid arthritics. [e.g., Erganzungsbuch zum Deutschen Arzneibuch, Bundesanzeiger Nr. 173 vom 18.09.1986].

It is understood that pine sprout extracts have been pharmacologically effective in countering the daily "attacks" of smoking, alcohol consumption, vehicle-emissions, pollution, etc., and so sustaining or improving city dwellers, health.

Pine sprout extracts have been well used as a folk theraphy in order to acquire such pharmacological efficacy. The above-cited literature teaches a way to prepare a tea infusion by steeping 1 to 2 teaspoonful of pine sprouts in ¼ liter of water for 10 to 15 minutes and straining it. It can be sweetened with honey.

A fresh delicious health beverage which imparts the pharmacological efficacy of nine is highly desired by people from all walks of life.

Therefore, an object of the invention is to provide a composition that:

(a) removes the bitterness of the pine sprout extract;

(b) retains the unique natural aroma and flavor of pine; and (c) imparts the pharmacological efficacy of pine.

We prepared various pine compositions by combining the daily effective dosage of pine sprout extract with various additives and adjusting their ratios, and then conducted a sensation test on each pine composition.

It was discovered that a certain constituency produces the best sensual texture without the original bitterness of the pine sprout extract and even a minor deviation from the constituency results in drastic effects in the flavor, aroma and mouthfeel.

Specifically, we found that when 0.2 to 0.5% of pine sprout extract was combined with 0.04 to 0.1% of pine needle essence, 0.1 to 0.5% of vitamin C, 3 to 4% of white sugar, 5 to 6% of fructose, 0.1 to 0.2% of citric acid, 0.03 to 0.05% of malic acid and 0.04 to 0.05% of sodium citrate (the said percentages being based on the total weight of the composition), the resulting composition led to the best sensual texture with even a minor deviation in one or more of the said ingredients' ratios leading to drastic effects in the overall enjoyment.

SUMMARY OF THE INVENTION

The present invention provides a beverage co-position comprising 0.2 to 0.5% of pine sprout extract, 0.04 to 0.1% of pine needle essence, 0.1 to 0.5% of vitamin C, 3 to 4% of white sugar, 5 to 6% of fructose, 0.1 to 0.2% of citric acid, 0.03 to 0.05% of malic acid and 0.04 to 0.05% of sodium citrate.

Natually occuring pigments may be further added to change the colour of the composition. Preferably, they are used between 0.01 and 0.02%.

BRIEF DESCRIPTION OF THE DRAWING

FIG. 1 represents a diagram of the whole procedure of preparing the beverage according to the present invention.

DETAILED DESCRIPTION OF THE INVENTION

The source of the pine sprout used in the invention is one which is gown from the shoot apex of young pine branch during March and April. However, it is understood by those skilled in the field that since all kinds of pine have the same or relatively similar pharmacological efficacy, the choice of pine species is not critical.

The pine sprout extract used in the invention is produced according to the following procedure: 400 kg of Sinus Densifulora sprout and 5000 L of purified water are coalesced by heating them to 80° C.–90° C. for 15 to 18 hours and then filtered with a 10 µm nylon filter. The filtrates are concentrated to a volume of 60 kg using a vacuum thin layer plate evaporator. The resulting concentrates are mixed with 40 kg of glucose syrup to produce 100 kg of the desired pine sprout extract. The extract product is 62% to 67% solid by volume.

The pine needle essence is prepared according to the following procedure: pine needle oil, as obtained under the commercial name Pine Flavor from Emilflachsmann AG, Switzerland, is mixed in a tank with ethyl alcohol and purified water and stirred at low velocity (about 10 rpm) for 10 minutes. Then the mixture stands at low-temperatures for at least 20 hours and then is filtrated. The filtrates additionally stand at a room temperature for 24 hours to form the pine needle essence. The pine needle essence is a pale yellow colour and has a dense pine aroma.

The beverage composition of the present invention is prepared in accordance with the following procedure: the extract product is mixed with citric acid, malic acid and sodium citrate, and gently stirred. Vitamin C, pine needle essence and naturally occuring pigments are added to the mixture, and stirred again. Alternatively, citric acid, malic acid and sodium citrate, vitamin C, pine needle essence and naturally occuring pigments are together mixed and stirred before the pine extract product is added.

The final phase of the composition, which makes it fit for human consumption, is completed according to the following procedure: the resulting composition above is completely dissolved in purified water. The solution obtained therefrom is passed through at least 200 mesh before it is filled in a can or bottle. It is then sterilized at 90° C. for 5 to 10 minutes and stored in a refrigerator. Alternatively, the solution, which has been passed through at least 200 mesh, can be cooled to 4°–8° C. after which carbonic acid gas can be injected into the solution using a tank in which the pressure of carbonic acid gas has been adjusted to 1–1.5 kg/cm$^2$. The subsequent sterilization is conducted for 5–10 minutes at the temperatures between 70° C. and 75° C.

As another aspect, the present invention provide a process for producing a beverage composition containing 0.2 to 0.5% of pine sprout extract with 0.04 to 0.1% of pine needle essence, 0.1 to 0.5% of vitamin C, 3 to 4% of white sugar, 5 to 6% of fructose, 0.1 to 0.2% of citric acid, 0.03 to 0.05% of malic acid and 0.04 to 0.05% of sodium citrate, the said percentages being based on the total weight of the composition, which comprises coalescing pine sprout and water by heating them to the temperatures between 80° C. and 90° C. for 15 to 18 hours; filtrating the coalescents through 10 μm nylon filter; concentrating the filtrates; mixing the resulting concentrates with syrupus glucose at the ratio of 6:4 to obtain pine sprout extract; mixing the resulting pine sprout extract with the above additives to obtain the beverage composition.

The following examples, in which all percentages are by weight, is given only for the purpose of Illustration.

EXAMPLE 1

0.05% of pine needle essence, 0.1% of vitamin C, 5.85 of fructose, 3.87% of white sugar, 0.12% of citric acid, 0.03% of malic acid, 0.04% of sodium citrate and 0.02% of Gardenia blue pigment were completely dissolved in a small amount of purified water, and 0.2% of seperately prepared pine sprout extract was added to the solution to produce the beverage compositon. The composition was placed in a mass cylinder in which 89.77% of purified water was subsequently added to produce the dilute beverage. The beverage thus obtained was passed through 200 mesh and filled in a can, which was subsequently sterilized for 10 minutes at the temperature of 90° C.

250 mL of the beverage according to Example 1 correspond to 2 g of pine sprout which is believed to exhibit the minimum pharmacological efficacy of pine.

EXAMPLE 2

The same amounts of pine needle essence, vitamin C, fructose, white sugar, citric acid, malic acid, sodium citrate and naturally occuring pigment as used in Example 1 were completely dissolved in a small amount of purified water, and 0.2% of separately prepared pine sprout extract was added to the solution to produce the beverage composition. The composition was placed in a mass cylinder in which 89.77% of purified water was subsequently added to produce the dilute beverage. The beverage obtained therefrom was passed through 200 mesh and was cooled to 8° C. While maintaining the temperature of 8° C. the carbonic acid gas was injected in the cold composition using a tank in which the carbonic acid gas was pressured at 1.5 kg/cm². After completion of injection, the resulting solution was filled in a can, which was subsequently sterilized for 8 minutes at the temperature of 75° C.

EXAMPLE 3

The beverage was prepared by the manner similar to that of Example 1, except the following constitution was established:

| Ingredients | Amount (% by weight) |
| --- | --- |
| Pine sprout extract | 0.250 |
| Pine needle essence | 0.050 |
| Vitamin C | 0.100 |
| Fructose | 5.000 |
| White sugar | 3.500 |
| Citric acid | 0.100 |
| Sodium citrate | 0.040 |
| Malic acid | 0.030 |

-continued

| Ingredients | Amount (% by weight) |
| --- | --- |
| Pigment | 0.010 |
| Purified water | 90.920 |
| | 100.000 |

EXAMPLE 4

The beverage was prepared by the manner similar to that of Example 1, except the following constitution was established:

| Ingredients | Amount (% by weight) |
| --- | --- |
| Pine sprout extract | 0.300 |
| Pine needle essence | 0.070 |
| Vitamin C | 0.200 |
| Fructose | 5.500 |
| White sugar | 3.650 |
| Citric acid | 0.120 |
| Sodium citrate | 0.050 |
| Malic acid | 0.035 |
| Pigment | 0.015 |
| Purified water | 90.060 |
| | 100.000 |

EXAMPLE 5

The beverage was prepared by the manner similar to that of Example 1, except the following constitution was established:

| Ingredients | Amount (% by weight) |
| --- | --- |
| Pine sprout extract | 0.350 |
| Pine needle essence | 0.080 |
| Vitamin C | 0.300 |
| Fructose | 5.600 |
| White sugar | 3.750 |
| Citric acid | 0.150 |
| Sodium citrate | 0.045 |
| Malic acid | 0.040 |
| Pigment | 0.015 |
| Purified water | 89.670 |
| | 100.000 |

EXAMPLE 6

The beverage was prepared by the manner similar to that of Example 1, except the following constitution was established:

| Ingredients | Amount (% by weight) |
| --- | --- |
| Pine sprout extract | 0.400 |
| Pine needle essence | 0.090 |
| Vitamin C | 0.400 |
| Fructose | 5.700 |
| White sugar | 3.800 |
| Citric acid | 0.180 |
| Sodium citrate | 0.040 |
| Malic acid | 0.045 |
| Pigment | 0.015 |

-continued

| Ingredients | Amount (% by weight) |
|---|---|
| Purified water | 89.330 |
| | 100.000 |

EXAMPLE 7

The beverage was prepared by the manner similar to that of Example 1, except the following constitution was established:

| Ingredients | Amount (% by weight) |
|---|---|
| Pine sprout extract | 9.500 |
| Pine needle essence | 0.100 |
| Vitamin C | 0.500 |
| Fructose | 6.000 |
| White sugar | 4.000 |
| Citric acid | 0.200 |
| Sodium citrate | 0.040 |
| Malic acid | 0.050 |
| Pigment | 0.020 |
| Purified water | 88.590 |
| | 100.000 |

SENSATION TEST

A sensation test for the beverages of Examples 1 to 7 was performed in duplicate, the term between first test and second test being one week. Twenty gourmet experts were participated in the test. The beverage was evaluated according to the following scale:

1=very unpleasant
2=unpleasant
3=moderate
4=excellent
5=outstanding

The results of the test are shown in Table I below, the values of which were indicated as an average of duplicate results.

TABLE I

| Test items | Example No. | | | | | |
|---|---|---|---|---|---|---|
| | 1 | 3 | 4 | 5 | 6 | 7 |
| Aroma | 3.8 | 4.0 | 3.8 | 3.9 | 3.9 | 4.0 |
| Flavor | 4.2 | 4.1 | 4.3 | 4.2 | 4.0 | 4.2 |
| Mouthfeel | 4.1 | 4.0 | 4.1 | 4.2 | 4.3 | 4.1 |
| Color | 4.0 | 4.2 | 4.1 | 3.9 | 4.2 | 4.2 |
| Overall enjoyment | 4.3 | 4.2 | 4.0 | 4.1 | 4.2 | 4.0 |

It will be appreciated by artisans in the field that the results of Table I show that the beverage composition of the invention, in terms of sensual texture and physiological effects, will be commercially advantageous.

The beverages according to Examples 8–12 were prepared as described in Example 1, except the constitution was changed as illustrated in Table II below:

TABLE II

| Ingredients | Example Nos. | | | | |
|---|---|---|---|---|---|
| | 8 | 9 | 10 | 11 | 12 |
| Pine sprout extract | 0.25 | 0.2 | 0.3 | 0.2 | 0.25 |
| Pine needle essence | 0.03 | 0.04 | 0.035 | 0.05 | 0.045 |
| Vitamin C | 0.1 | 0.15 | 0.1 | 0.1 | 0.1 |
| Fructose | 7 | 6 | 5.5 | 6 | 5 |
| White sugar | 3 | 5 | 5 | 4.5 | 5 |
| Citric acid | 0.13 | 0.15 | 0.17 | 0.15 | 0.13 |
| Sodium citrate | 0.05 | 0.04 | 0.03 | 0.03 | 0.04 |
| Malic acid | 0.03 | 0.03 | 0.04 | 0.045 | 0.045 |
| Pigment | 0.01 | 0.02 | 0.015 | 0.015 | 0.02 |
| Purified water | 89.4 | 89.37 | 88.81 | 88.91 | 90.37 |

We applied a sensation to the beverages of Examples 8–12, the results of which are shown in Table III below:

TABLE III

| Test items | Example Nos. | | | | |
|---|---|---|---|---|---|
| | 8 | 9 | 10 | 11 | 12 |
| Aroma | 3.2 | 3.6 | 3.3 | 3.4 | 3.2 |
| Flavor | 3.0 | 3.2 | 3.1 | 2.9 | 3.1 |
| Mouthfeel | 3.1 | 3.2 | 3.0 | 2.8 | 3.2 |
| Color | 3.9 | 4.1 | 4.2 | 4.1 | 4.2 |
| Overall enjoyment | 3.0 | 3.2 | 3.1 | 3.1 | 3.0 |

As illustrated by Tables II and III it can be seen that even a minor deviation from the characteristic constituency of the invention results in drastic effects in the sensual texture.

What is claimed is:

1. A process for producing a beverage composition containing 0.2 to 0.5% of pine sprout extract with 0.04 to 0.1% of pine needle essence, 0.1 to 0.5% of vitamin C, 3 to 4% of white sugar, 5 to 6% of fructose, 0.1 to 0.2% of citric acid, 0.03 to 0.05% or malic acid and 0.04 to 0.05% of sodium citrate, the said percentages being based on the total weight of the composition, which comprises:

coalescing pine sprout and water by heating them to the temperatures between 80° C. and 90° C. for 15 to 18 hours;

filtrating the coalescents;

concentrating the filtrates;

mixing the resulting concentrates with glucose syrup to obtain pine sprout extract;

mixing the resulting pine sprout extract with the above additives to obtain the beverage composition.

2. The process according to claim 1, wherein the said filtration is conducted using 10 m nylon filter.

3. The process according to claim 1, wherein the ratio of the concentrated pine sprout to the glucose syrup is 6:4.

* * * * *